United States Patent
Keung et al.

(10) Patent No.: US 8,853,327 B2
(45) Date of Patent: Oct. 7, 2014

(54) METHODS AND APPARATUS FOR FORMING BLENDS OF POLYOLEFIN AND RESIN MODIFIER

(75) Inventors: Jay K. Keung, Humble, TX (US); Yann Devorest, Waterloo (BE); Chia Y. Cheng, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/822,656

(22) PCT Filed: Aug. 19, 2011

(86) PCT No.: PCT/US2011/048386
§ 371 (c)(1),
(2), (4) Date: Apr. 18, 2013

(87) PCT Pub. No.: WO2012/050661
PCT Pub. Date: Apr. 19, 2012

(65) Prior Publication Data
US 2013/0281625 A1    Oct. 24, 2013

Related U.S. Application Data

(60) Provisional application No. 61/393,564, filed on Oct. 15, 2010, provisional application No. 61/481,992, filed on May 3, 2011.

(51) Int. Cl.
*C08J 3/00*     (2006.01)
*C08L 23/12*    (2006.01)
(Continued)

(52) U.S. Cl.
CPC .............. *C08L 23/12* (2013.01); *B29C 47/385* (2013.01); *B29C 47/367* (2013.01); *B29K 2105/16* (2013.01); *B29K 2995/0053* (2013.01); *B29C 47/0004* (2013.01); *B29C 2791/001* (2013.01); *B29K 2105/0005* (2013.01); *B29C 47/60* (2013.01); *B29C 47/767* (2013.01); *B29C 2947/92704* (2013.01); *B29C 47/38* (2013.01); *B29C 47/1063* (2013.01); *B29C 47/82* (2013.01); *B29C 47/1045* (2013.01); *B29C 2947/92895* (2013.01); *B29C 47/0811* (2013.01); *B29C 47/62* (2013.01); *B29C 47/6018* (2013.01); *B29K 2105/06* (2013.01); *B29C 47/0021* (2013.01); *B29L 2007/008* (2013.01); *B29C 47/605* (2013.01); *B29C 47/366* (2013.01)
USPC .......... 525/197; 525/54.4; 525/54.5; 525/216; 528/502 C (58) Field of Classification Search
USPC ....... 525/53, 54.4, 54.5, 197, 216; 528/502 C
See application file for complete search history.

(56) References Cited

U.S. PATENT DOCUMENTS 3,313,754 A * 4/1967 Logan ............................ 524/187
3,665,068 A * 5/1972 Duling et al. .................. 264/211
(Continued)

FOREIGN PATENT DOCUMENTS

EP   0012405   12/1978
EP   0015472   3/1979
(Continued)

OTHER PUBLICATIONS

Kirk Othmer: Encyclopedia of Chemical Technology vol. 13, 1995, J. Wiley & Sons article "Hydrocarbon Resins", pp. 717-743.

*Primary Examiner* — Fred M Teskin (57) ABSTRACT

A process for preparing a blend of thermoplastic polymer and resin modifier within a single-screw extruder, wherein the resin modifier is a hydrocarbon resin.

21 Claims, 4 Drawing Sheets

(51) Int. Cl.
  *B29C 47/38* (2006.01)
  *B29C 47/60* (2006.01)
  *B29C 47/10* (2006.01)
  *B29C 47/08* (2006.01)
  *C08L 23/04* (2006.01)
  *C08L 23/10* (2006.01)
  *B29C 47/36* (2006.01)
  *B29K 105/16* (2006.01)
  *B29C 47/00* (2006.01)
  *B29K 105/00* (2006.01)
  *B29C 47/76* (2006.01)
  *B29C 47/82* (2006.01)
  *B29C 47/62* (2006.01)
  *B29K 105/06* (2006.01)
  *B29L 7/00* (2006.01)

(56) References Cited

U.S. PATENT DOCUMENTS

| | | | |
|---|---|---|---|
| 4,000,884 A * | 1/1977 | Chung | 366/88 |
| 4,786,181 A | 11/1988 | O'Brien | |
| 4,913,641 A | 4/1990 | Zahradnik | |
| 5,213,744 A | 5/1993 | Bossaert | |
| 6,672,753 B1 | 1/2004 | Womer et al. | |
| 2008/0075922 A1 | 3/2008 | Ueda | |

FOREIGN PATENT DOCUMENTS

| | | |
|---|---|---|
| EP | 0002606 | 6/1979 |
| EP | 0008904 | 3/1980 |
| EP | 0027586 | 4/1981 |
| EP | 0060037 | 9/1982 |
| EP | 0082726 | 6/1983 |
| EP | 0126640 | 11/1984 |
| EP | 0128077 | 12/1984 |
| EP | 0061238 | 6/1985 |
| EP | 0920971 | 6/1999 |
| EP | 706873 | 1/2002 |
| GB | 1440317 | 6/1976 |
| GB | 1452424 | 10/1976 |
| GB | 1495776 | 12/1977 |
| GB | 1550570 | 8/1979 |
| GB | 2028168 | 3/1980 |
| GB | 1566077 | 4/1980 |
| GB | 1569112 | 6/1980 |
| GB | 2098542 | 11/1982 |
| GB | 2140314 | 11/1984 |
| JP | 2001/096603 | 4/2001 |

* cited by examiner

METHODS AND APPARATUS FOR FORMING BLENDS OF POLYOLEFIN AND RESIN MODIFIER

PRIORITY CLAIM

This application is a National Stage Application of International Application No. PCT/US2011/048386 filed Aug. 19, 2011, which claims priority to and the benefit of U.S. Provisional Application Ser. No. 61/393,564, which was filed Oct. 15, 2010, both of which are fully incorporated herein by reference in their entireties.

FIELD

Embodiments of the present invention are directed toward a method for preparing a blend of a polyolefin and a resin modifier within a single-screw extruder.

BACKGROUND

Blends of polyolefin (e.g., polypropylene) and resin modifier (e.g., hydrogenated petroleum resin) have commercial importance. For example, these materials are often blended and formed into films having desirable stiffness, clarity, heat sealability and/or barrier properties. These films are often produced using film extruders, which typically include a single-screw extruder for processing and conveying the materials. In order to effectively use a single-screw extruder for this purpose; however, prefabricated blends of the polyolefin and hydrocarbon resin had to be prepared. In other words, the very large difference in softening and melting temperatures between polyolefin and hydrocarbon resin, as well as the rheological differences in their properties, has proven to be an insurmountable barrier to directly adding these materials to a single-screw extruder for purposes of mixing and processing the materials in a single step. Of the many problems experienced are poor dispersion of the modifier within the polyolefin, extrusion instability, surging, and low output rate.

In order to overcome the problems in the prior art, U.S. Pat. No. 5,213,744 teaches a process whereby a concentrate or masterbatch of polyolefin and modifier (which is advantageously in the form of pellets) is prepared in a twin-screw extruder and the concentrate is subsequently charged to a single-screw extruder for processing and conveying in fabrication processes such as film forming processes. The formation of the concentrate advantageously allowed for the introduction of additional polyolefin and the successful blending a processing of the polyolefin together with the concentrate within the single-screw extruder.

In addition to forming a concentrate as taught by the US'744, the prior art clearly suggests that the problems associated with blending polyolefin and modifier can be overcome by using a twin-screw extruder. In other words, if a twin-screw extruder were used during the fabrication process (e.g., film forming process), then the blending, processing and conveying of the polyolefin and modifier can be achieved without the need for the concentrate. While apparent, this solution is not practical because of the significant capital costs associated with a twin-screw extruder.

Since production of the concentrate of polyolefin and modifier can be time consuming, energy consuming, and economically disadvantageous, there remains a need to overcome problems associated with blending polyolefin and resin modifier within a single-screw extruder, which solution will allow one-step fabrication processes, such as film-forming processes.

SUMMARY

One or more embodiments of the present invention provide a process for preparing a blend of thermoplastic polymer and modifier, the process comprising the steps of: (i) charging neat thermoplastic polymer to a single-screw extruder; (ii) charging neat resin modifier to the extruder; (iii) conveying the thermoplastic polymer and modifier through a feed section of the extruder to form a blend, where the feed section has a feed depth; (iv) conveying the blend through a compression section of the extruder to thereby form a molten blend; (v) mixing the molten blend after said step of conveying the blend through the compression section to thereby impart positive pressure on the molten blend in a downstream direction; (vi) conveying the molten blend through a metering section, where the metering section has a metering depth; and (vii) extruding the molten blend wherein the blend or molten blend is subjected to a compression ratio that is greater than 1.2, where the compression ratio is the ratio of the feed depth to the metering depth.

Other embodiments relate to a process for preparing a blend of thermoplastic polymer and resin modifier, the process comprising: i) heating a thermoplastic polymer to a temperature to form a polymer melt; ii) heating a resin modifier to a temperature to form a resin modifier melt wherein the resin modifier is a hydrocarbon resin; iii) introducing the resin modifier melt to the polymer melt to form a blend; and iv) mixing the blend.

DETAILED DESCRIPTION OF ILLUSTRATIVE EMBODIMENTS

Introduction

Embodiments of the invention are based, at least in part, on the discovery of a process that allows thermoplastic polymer and resin modifier to be initially melt blended within a single-screw extruder. While the prior art teaches that factors preclude successfully accomplishing this blending, and the desire to do so spans at least two decades, it has unexpectedly been discovered that design changes within the extruder and/or processing changes in the operating of the extruder allow for the initial melt blending of thermoplastic polymer and resin modifier within a single-screw extruder. In one or more embodiments, the unexpected discovery is achieved by employing a screw design that has a relatively high compression ratio, which results in the blend experiencing greater pressure while in the extruder. In these or other embodiments, the length of the feed section is relatively long, and the feed depth the feed section is relatively high. In these or other embodiments, the unexpected discovery is achieved by employing a mixing element downstream of the compression section that serves to pump molten material downstream thereby relieving pressure on the compression section. In other embodiments, the difficulties observed in the prior art are overcome by introducing molten thermoplastic polymer with pourable resin modifier. Within these embodiments, the resin modifier can be heated beyond the softening point of the resin and introduced into an extruder in which the thermoplastic polymer has been melted. By practicing one or more embodiments of this invention, homogeneous blends of thermoplastic polymer and resin modifier can advantageously be obtained.

A "thermoplastic polymer" means a high polymer that softens when exposed to heat and returns to its original condition when cooled to room temperature which includes but is not limited to polyvinyl chloride, nylons, fluorocarbons, linear polyethylene, polyurethane prepolymer, polystyrene, polyethylene, polypropylene, and acrylic resins.

In another embodiment, a thermoset polymer may be melt blended with a resin modifier within a single-screw extruder using the invention as described herein.

A "thermoset polymer" means a high polymer that solidifies or sets irreversibly when heated including but not limited to certain phenolics, alkyds, amino resins, polyesters, epoxides, and silicones.

Ingredients

In one or more embodiments, the thermoplastic polymer is a polyolefin of a mono-alpha olefin containing from 2 to 8 carbon atoms (e.g., 2 to 4 carbon atoms per molecule). In one or more embodiments, the polyolefin may be a homopolymer of one, or a copolymer of two or more of the following olefins: ethylene, propylene, butene-1, hexene-1 and 4-methyl pentene-1. In one or more embodiments, the polyolefin is polypropylene, such as high molecular weight stereoregular predominantly crystalline polypropylene. Alternatively, it is a copolymer of propylene with up to 20 wt % of another olefin, e.g., ethylene, could be used.

In one or more embodiments, the polyolefin is a high molecular weight polymer including those polymers having a number average molecular weight in excess of 5 kg/mol, in other embodiments in excess of 10 kg/mol, in other embodiments in excess of 25 kg/mol, in other embodiments in excess of 50 kg/mol, and in other embodiments in excess of 100 kg/mol. In these or other embodiments, the polyolefin is characterized by a melt flow index (ASTM D1505) of less than 15 g/10 min, in other embodiments less than 10 g/10 min, other embodiments less than 5 g/10 min, other embodiments less than 3 g/10 min, and in other embodiments less than 1 g/10 min.

In certain embodiments, the polyolefin is an isotactic polypropylene with a density of from 0.86 to 0.92 g/cc as measured at 23° C. according to ASTM D1505 and a melt flow index of from 1 to 15 g/10 min. as determined according to ASTM 1238 (conditions 230° C. and 2.16 kg). It may be made by metallocene or Ziegler polymerization methods using for example $AlCl_3$ and $TiCl_4$ as catalysts. In another embodiment, the polyolefin is a polymer comprising at least 50 mol % of one or more $C_2$ to $C_8$ olefins (herein "$C_2$-$C_8$ polyolefin").

In one or more embodiments, the polyolefin is introduced into the extruder in a neat form, which refers to a particulate mass such as a pellet or crumb in substantially pure form, which refers to the absence of non-polyolefin material that would otherwise have a deleterious impact on practicing the present invention. For example, in one or more embodiments, neat polyolefin is substantially devoid of materials having a number average molecular weight of less than 5 kg/mol. In one or more embodiments, the neat polyolefin includes less than 5 wt %, in other embodiments, less than 2 wt %, in other embodiments, less than 1 wt %, in other embodiments, less than 0.5 wt %, and in other embodiments, less than 0.1 wt % resin modifier. Specifically excluded from neat polyolefin is any homogeneous blend or masterbatch of the polyolefin with a resin modifier.

In general, the resin modifier, which may simply be referred to herein as modifier or modifiers, include amorphous or substantially amorphous materials that can be added to a polyolefin to achieve benefits such as stiffening action, increased modulus, increased strength (particularly in films), and/or modification of flow characteristics. In one or more embodiments, the resin modifier can be a low molecular weight natural or synthetic resin that is compatible with the polyolefins) and that provide the desired enhancement of film properties. Various types of natural and synthetic resins, alone or in admixture with each other, may be selected as the resin modifier.

Natural resins are defined as resins of plant or animal origin. Exemplary natural resins include, but are not limited to, natural rosins, natural rosin esters, gum rosins, gum rosin esters, wood rosins, wood rosin esters, tall oil rosins, and tall oil rosin esters. Synthetic resins are defined as resins resulting from controlled chemical reactions. Synthetic resins include hydrocarbon resins described herein.

Hydrocarbon resins are amorphous or substantially amorphous, low molecular weight resins synthesized via thermal or catalytic polymerization. Exemplary hydrocarbon resins include, but are not limited to, those deriving from coal tar, petroleum, and turpentine feedstocks, as well as rosins, such hydrocarbon resins being referred to as petroleum resins, synthetic polyterpenes, coal tar resins, and synthetic rosins.

In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5 kg/mol, in other embodiments less than about 3 kg/mol, in other embodiments less than about 1 kg/mol and in other embodiments from about 500 g/mol to about 1000 g/mol.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Suitable resins include, but are not limited to, natural rosins and rosin esters, hydrogenated rosins, hydrogenated rosin esters, coumarone-indene resins, petroleum resins, polyterpene resins, and terpene-phenolic resins.

Specific examples of suitable petroleum resins include, but are not limited to, aliphatic hydrocarbon resins, hydrogenated aliphatic hydrocarbon resins, aromatic modified aliphatic hydrocarbon resins, hydrogenated aromatic modified aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins, polycyclopentadiene resins, hydrogenated polycyclopentadiene resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, and mixtures of two or more thereof. As used herein, "hydrogenated" includes fully, substantially, and at least partially hydrogenated resins. Suitable aromatic resins include aromatic modified aliphatic resins; aromatic modified cycloaliphatic resin; and hydrogenated aromatic hydrocarbon resins. Any of the above resins may be grafted with an unsaturated ester or anhydride to provide enhanced properties to the resin. In other embodiments, the resin modifier is non-polar, which refers to a resin modifier that is substantially free of monomers having polar groups. For additional description of resin modifiers, reference can be made to technical literature, e.g., Hydrocarbon Resins, Kirk-Othmer, Encyclopedia of Chemical Technology, 4th Ed. v. 13, pp. 717-743 (J. Wiley & Sons, 1995).

The petroleum resins include those obtained by the catalytic or thermal polymerization of a mixture of monomers derived from deep cracking petroleum which monomers are chiefly mono- and di-olefins. The catalytic polymerization of these mixtures is generally carried out at low temperatures using Friedel-Crafts catalysts. These resins have softening temperatures (Ball and Ring) ranging from 50° C. to 150° C., a specific gravity 25/25° C. of 0.96-0.980, an iodine value (Wijs) of 80-150, and a molecular weight of 500 to 2000.

In one embodiment, the petroleum resins are cycloaliphatic resins such as dicyclopentadiene (DCPD) resins which may be obtained by or derived from thermal polymerization of a feed comprising unsaturated monomers of DCPD and/or substituted DCPD.

In one embodiment, the feed also comprises aromatic monomers such as $C_8$-$C_{10}$ aromatic monomers (referred to herein as $C_9$ monomers). The $C_9$ monomers include aromatic compounds such as styrene, indene, derivatives of styrene, derivatives of indene, and combinations thereof. Particularly preferred aromatic olefins include styrene, α-methylstyrene, β-methylstyrene, indene, methylindenes and vinyl toluenes. In such embodiments, a mixture of (a) DCPD stream, preferably a steam cracked petroleum distillate boiling in the range 80° C. to 200° C., more preferably 140° C. to 200° C., containing dimers and codimers of cyclopentadiene and its methyl derivatives is combined together with (b) $C_9$ monomers, preferably a steam cracked distillate boiling in the range 150° C. to 200° C. comprising α-methyl styrene, vinyl toluenes, indene and methyl indene with other $C_9$ and $C_m$ aromatics to produce an aromatic modified cycloaliphatic such as an aromatic modified DCPD hydrocarbon resin.

The petroleum resins can be hydrogenated to reduce their unsaturation, lighten their color and otherwise improve their properties. These hydrogenated petroleum resins may be prepared by catalytically hydrogenating a thermally polymerized steam cracked petroleum distillate fraction, especially a fraction having a boiling point of between 20° C. and 280° C. These fractions usually are of compounds having one or more unsaturated cyclic rings in the molecule, such as cyclodienes, cycloalkenes and indenes. It is also possible to hydrogenate resins produced by the catalytic polymerization of unsaturated hydrocarbons.

Before hydrogenation occurs, the polymerized resin may be dissolved in a saturated hydrocarbon solvent such as heptane. The hydrogenation catalysts used may be nickel, reduced nickel, or molybdenum sulphide. Hydrogenation can take place in a single stage at a temperature of 200° C. to 330° C., (e.g., 210° C. to 230° C.) at a pressure of 20 to 120 atmospheres, (e.g., 30 to 90 atmospheres) for a period of 5 to 7 hours. After filtering off the catalyst, the solvent is removed by distillation and recovered for recycling. An improved hydrogenation process leading to increased yields of high quality hydrogenated hydrocarbon resins is described and claimed in European Patent 0082726 (Application No. 82306853.1).

Another type of hydrocarbon resin useful in the present invention is the polymers of unsaturated coal tar by-products such as the polyindene and coumarone-indene resins. Also useful are the hydrocarbon resins known as styrene resins, as for example, polystyrene, styrene-olefin and styrene-diolefin copolymers, poly(α-methylstyrene), α-methyl-styrene-vinyl toluene copolymer, etc. These resins will generally have a softening point (Ball and Ring) of from about 50° C. to about 150° C.

Any of the usual types of natural resins can be used in accordance with this invention, such as wood rosin, gum rosin, tall oil rosin, and the modified rosins, such as partially or substantially completely hydrogenated rosins, dehydrogenated rosins, disproportionated rosins, polymerised rosins, rosin alcohols, heat-treated rosins, and mixtures of two or more thereof. Other examples of natural resins include hydrogenated gum rosin resin, gum rosin ester resins, hydrogenated gum rosin ester resins, wood rosin resin, hydrogenated wood rosin resins, wood rosin ester resins, hydrogenated wood rosin ester resins, tall oil rosin resins, hydrogenated tall oil rosin resins, tall oil rosin ester resins, hydrogenated tall oil rosin ester resins, rosin acid resins, hydrogenated rosin acid resins, and mixtures of two or more thereof. These natural resins may have Ring and Ball softening points of at least 60° C.

Suitable rosin esters include polyhydric alcohol esters of natural rosins, hydrogenated rosins, polymerized rosins, etc, such as the glycerol and pentaerythritol esters of wood rosin, the ethylene glycol, glycerol and pentaerythritol esters of polymerised rosin, the glycerol and pentaerythritol esters of the hydrogenated rosins, etc.

Exemplary resin modifiers suitable for use as described herein include OPPERA™ resins available from ExxonMobil Chemical such as OPPERA™ PR100A Resin; ARKON™ P140, P125, P115, M115, and M135 and SUPER ESTER™ rosin esters available from Arakawa Chemical Company of Japan; SYLVARES™ polyterpene resins, styrenated terpene resins and terpene phenolic resins and SYLVATAC™ and SYLVALITE™ rosin esters available from Arizona Chemical Company; NORSOLENE™ aliphatic aromatic resins available from Cray Valley of France; DERTOPHENE™ terpene phenolic resins and DERCOLYTE™ polyterpene resins available from DRT Chemical Company of France; EASTOTAC™ resins, PICCOTAC™ resins, REGALITE™ and REGALREZ™ hydrogenated cycloaliphatic/aromatic resins available from Eastman Chemical Company of Kingsport, Tenn.; WINGTACKT™ resins available from Goodyear Chemical Company, PICCOLYTE™; PERMALYN™ polyterpene resins, rosins and rosin esters available from Eastman Chemical Company; coumerone/indene resins available from Neville Chemical Company; QUINTONET™ acid modified $C_5$ resins, $C_5$/$C_9$ resins, and acid modified $C_5$/$C_9$ resins available from Nippon Zeon of Japan; and CLEARON™ hydrogenated terpene resins available from Yasuhara. The preceding examples are illustrative only and by no means limiting.

In certain embodiments, the resin modifier is functionalized to promote compatibility with the polymeric material of the polymeric layer. Promoting compatibility may be particularly important when a polar polymeric material is used in the polymeric layer of the multiple layer structures described herein. Exemplary polar polymeric materials include polyesters and polyurethanes. Functionalization may be accomplished by maleic anhydride in a twin-screw reaction extrusion.

Combinations of any of the foregoing resin modifiers are also contemplated for use as the resin modifier incorporated into the polymeric film described herein.

In one or more embodiments, the resin modifier is introduced into the extruder in a neat form, which refers to a particulate mass (such as a pellet or crumb) or a pourable composition that is in substantially undiluted form. In one or more embodiments, the neat resin modifier includes less than 5 wt %, in other embodiments, less than 2 wt %, in other embodiments, less than 1 wt %, in other embodiments, less than 0.5 wt %, and in other embodiments, less than 0.1 wt % of a $C_2$-$C_8$ polyolefin. In another embodiment, the term neat resin modifier specifically excludes any homogeneous blend or masterbatch of a $C_2$-$C_8$ polyolefin with a resin modifier.

In one or more embodiments, the weight ratio of polyolefin to resin modifier charged to the extruder may be 95:5 to 5:95, in other embodiments, 90:10 to 20:80, in other embodiments, 85:15 to 40:60, and in other embodiments, 80:20 to 50:50. In one or more embodiments, the blend that is formed by practicing the present invention may include from 5 wt % to 95 wt %, in other embodiments, from 10 wt % to 80 wt %, in other embodiments, from 15 wt % to 60 wt %, and in other embodiments, from 20 wt % to 50 wt % resin modifier.

Single-Screw Extruder

The processes associated with some embodiments of the present invention may be best understood with reference to the single-screw extruder in which the processes of these embodiments or at least a significant portion thereof, take place. While the description of these embodiments are best described with reference to a single, single-screw extruder, those skilled in the art appreciate that some industrial processes may employ multiple (e.g., 2 or more) single-screw extruders in series to accomplish the mixing that a longer extruder may accomplish. Accordingly, those skilled in the art will be able to easily extend the teachings of these embodiments to those situations where multiple single-screw extruders are employed in series. And, the scope of these embodiments should not be limited to the use of a single, single-screw extruder.

Figure 1:
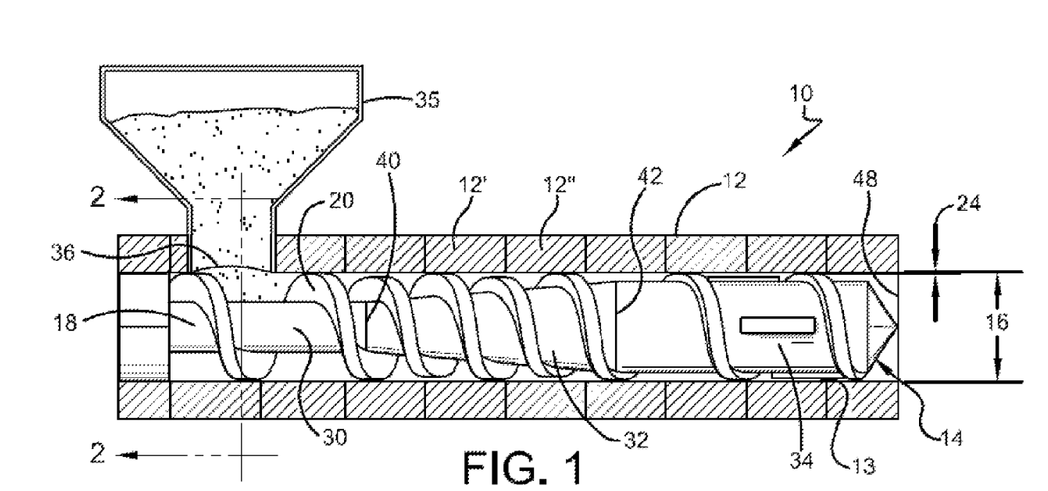
FIG. 1 is a partial cross-sectional view taken along the length of an exemplary single-screw extruder employed in one or more embodiments of the present invention.
Figure 2:
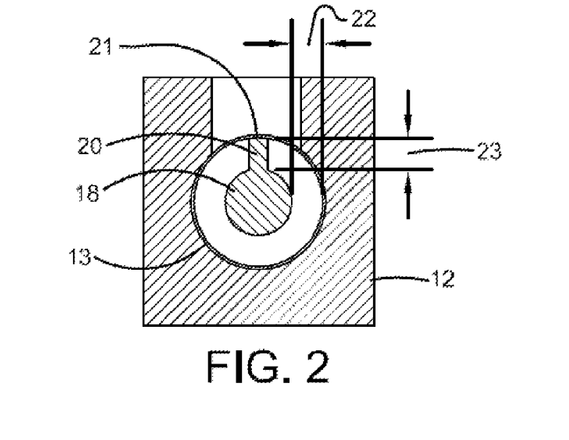
FIG. 2 is an illustrative cross-sectional axial view taken along line 2-2 of FIG. 1.

FIG. 1 depicts an exemplary extruder 10 including barrel 12 and screw 14. Barrel 12 may include a plurality of interconnected barrels (e.g., 12' and 12" as identified in the FIG. 1), and each barrel may be defined by an inner diameter (ID) 16. Screw 14 generally includes a shaft 18, and a generally helical flight(s) 20 extending from shaft 18. As best shown in FIG. 2, a space, which is referred to as a channel 22, exists between screw 14 and barrel 12. The depth of channel 22 (i.e., channel depth) is distance between shaft 18 and inner diameter 16. A gap 24 generally also is present between the tip of flight 20 and the inner barrel wall 13. The feed depth 23 is the average distance between shaft 18 and the tip of the flight 20 in the feed section 30. The compression depth 23 is the average distance between shaft 18 and the tip of the flight 20 in the compression section 32. The metering depth 23 is the average distance between shaft 18 and the tip of the flight 20 in the metering section 34. The extruder may be equipped with a feed hopper 35, which facilitates the introduction of materials into feed throat 36. The section depth refers to the average distance between shaft 18 and the tip of the flight 20 in the section at issue. As those skilled in the art appreciate, the single-screw extruders employed in practicing these embodiments generally include three distinct geometric sections along the linear length of the extruder. The first section may be referred to as feed section 30, the second section may be referred to as compression section 32 (which may also be referred to as melting section 32), and the third section may be referred to as metering section 34.

Feed section 30 generally extends from feed throat 36 to the beginning 40 of compression section 32. The feed depth 23 in feed section 30 is substantially constant, which refers to a variance in depth of less than 1.0 inch (2.6 cm), in other embodiments, less than 0.5 inch (1.3 cm), and in other embodiments, less than 0.3 inch (0.8 cm), in other embodiments, less than 0.2 inch (0.5 cm), and in other embodiments, less than 0.1 inch (0.3 cm). The channel depth 22 is also substantially constant, which refers to a variance in depth of less than 1.0 inch (2.6 cm), in other embodiments, less than 0.5 inch (1.3 cm), and in other embodiments, less than 0.3 inch (0.8 cm), in other embodiments, less than 0.2 inch (0.5 cm), and in other embodiments, less than 0.1 inch (0.3 cm).

In one or more embodiments, the feed depth 23 within feed section 30 may be defined with respect to a feed depth ratio of the feed section, which is the ratio of the feed depth 23 to the inner diameter 16 within the feed section. For example, if the feed section of an extruder has an inner diameter of 2.5 inches (6.4 cm), and a feed depth of 0.5 inch (1.3 cm), the feed depth ratio is 0.2. In one or more embodiments, the feed depth ratio of feed section 30 of the extruder employed in practicing the present invention is from about 0.150 to about 0.300, in other embodiments, from about 0.170 to 0.280, in other embodiments, from about 0.180 to about 0.260, in other embodiments, from about 0.190 to about 0.250, in other embodiments, from about 0.197 to about 0.240, in other embodiments, from about 0.199 to about 0.230, and in other embodiments, from about 0.200 to about 0.220, or any combination thereof.

Compression section 32 extends from beginning 40 to the end 42 of compression section, wherein the compression depth 23 decreases along the linear length of extruder 10 between beginning 40 and end 42 of compression section 32. In other words, shaft 18 increases in diameter from beginning 40 to end 42 of compression section 32.

In one or more embodiments, compression section 32 includes a double-flighted barrier screw. As those skilled in the art appreciate, a double-flighted barrier screw includes two channels; the first may be referred to as a solids channel and the second may be referred to as a melt channel. The flights may be referred to as a main flight and a barrier flight. As those skilled in the art appreciate, the barrier flight provides greater clearance between flight tip 21 and inner barrel wall 13 than does the main flight. As a result, melted material can travel from the solids channel to the melt channel. In one or more embodiments, the compression depth of the melt and solids channels (which is indicative of the amount of material that can flow through the channel) changes across the length of compression section. In one or more embodiments, the compression depth of the melt channel (melt compression depth) increases along the length of compression section 32 from beginning 40 (i.e., the upstream point) to the end 42 (i.e., the downstream point). And, in one or more embodiments, the compression depth of the solids channel (solids compression depth) decreases along the length of compression section 32 from beginning 40 (i.e., the upstream point) to the end 42 (i.e., the downstream point).

Metering section 34 extends from end 42 of compression section 32 to the end 48 of the extruder. The metering depth in metering section 34 is substantially constant, which refers to a variance in depth of less than 2.00 inch (5 cm), in other embodiments, less than 1.0 inch (1.3 cm), in other embodiments, from less than 0.75 inch (1.9 cm), in other embodiments, less than 0.5 inch (1.3 cm), in other embodiments, less than 0.25 inch (0.6 cm), and in other embodiments, less than 0.1 inch (0.25 cm). The depth of channel 22 in metering section 34 is also substantially constant, which refers to a variance in depth of less than 2.00 inch (5 cm), in other embodiments, less than 1.0 inch (1.3 cm), in other embodiments, from less than 0.75 inch (1.9 cm), in other embodiments, less than 0.5 inch (1.3 cm), in other embodiments, less than 0.25 inch (0.6 cm), and in other embodiments, less than 0.1 inch (0.25 cm).

In one or more embodiments, the metering depth within metering section 34 may be defined with respect to a metering depth ratio, which is the ratio of the metering depth to the inner diameter 16 within the metering section 34. For example, if the metering section of an extruder has an inner diameter of 2.5 inches (6.4 cm), and a metering depth of 0.3 inch (0.8 cm), the metering depth ratio is 0.12. In one or more embodiments, the metering depth ratio of the extruder employed in practicing the present invention is from about 0.010 to about 0.250, in other embodiments, from about 0.050 to about 0.200, in other embodiments, from about 0.100 to about 0.150, in other embodiments, from about 0.110 to about 0.140, in other embodiments, from about 0.115 to about 0.130, and in other embodiments, from about 0.118 to about 0.125, or any combination thereof.

In one or more embodiments, a mixing element (e.g., including blade 35) is positioned within the metering section 34. Practice of embodiments of the invention is not particularly limited by the selection of any particular mixing element. For example, a distributive mixer may be used such as cavity mixers, pin mixers, slot flight mixers, pineapple mixers, and variable depth mixers. In one or more embodiments, the mixing section or element may include a fluted mixing section such as a Maddock mixer or twisted Maddock mixer. Other specific distributive mixers include, but are not limited to, Dulmage mixers and Saxton mixers. As those skilled in the art appreciate, the mixing element may be designed to provide forward pumping capability which is believed to relieve pressure within compression section 32.

In one or more embodiments, the extruder employed in these embodiments may be defined by a compression ratio, which is the ratio of the feed depth to the metering depth. With reference to FIGS. 1 and 2, the feed depth is the average distance between shaft 18 and the tip of the flight 20 in the feed section 30, and the metering depth is the average distance between shaft 18 and the tip of the flight 20 in metering section 34. In one or more embodiments, the compression ratio of the extruder employed in practicing the present invention is at least 1.20, in other embodiments, at least 1.30, in other embodiments, at least 1.40, in other embodiments, at least 1.45, in other embodiments, at least 1.50, in other embodiments, at least 1.6, and in other embodiments, at least 1.7, in other embodiments, at least 2.5, in other embodiments, at least 3.0, in other embodiments, at least 3.5, in other embodiments, at least 4.5, in other embodiments, at least 5.0, and in other embodiments, at least 5.5.

The overall size of extruder 10, or any linear portion thereof (e.g., feed section) may defined with respect to the ratio of the length to the inner diameter 16 of the barrel, which may be expressed as a ratio of L/D. In one or more embodiments, the L/D of the single-screw extruder employed in the practice of the present invention is at least 20, in other embodiments, at least 25, in other embodiments, at least 27, in other embodiments, at least 30, and in other embodiments, at least 35.

Similarly, the size of the various sections of the extruder can be defined based upon the L/D ratio. In one or more embodiments, the feed section has an L/D of at least 4, in other embodiments, at least 5, in other embodiments, at least 6, in other embodiments, at least 7, and in other embodiments, at least 8. In these or other embodiments, the feed section has an L/D of less than 15, in other embodiments, less than 12, and in other embodiments, less than 10.

Also, in one or more embodiments, the metering section has an L/D of at least 5, in other embodiments, at least 7, and in other embodiments, at least 8. In these or other embodiments, the metering section has an L/D of less than 14, in other embodiments, less than 10 and in other embodiments, less than 9.

Mixing/Extrusion Process

In one or more embodiments, the process of these embodiments may be practiced by charging neat polyolefin and neat resin modifier to a single-screw extruder, such as the single-screw extruder described above. As is known in the art, the step of charging may include introducing these materials to the feed throat of the extruder by optionally employing a feed hopper. In one or more embodiments, the materials are fed to the feed throat of the extruder by employing a closed gravimetric system. Advantageously, the use of a gravimetric system allows for the accurate metering of the resin modifier at a desired dosage. These systems may include a self-cleaning, self-calibrated belt feeder on a load cell. In particular embodiments, the devices or means for charging or delivering the materials to the extruder are devoid of pneumatic raw material feeders.

Once inside the extruder, the materials are blended and conveyed through the feed section of the extruder to form a blend. As those skilled in the art appreciate, this blending and conveying is accomplished by the turning of the screw, which may take place at speeds in excess of 20 rpm, in other embodiments, in excess of 60 rpm, in other embodiments, in excess of 75 rpm, in other embodiments, in excess of 100 rpm, and in other embodiments, in excess of 150 rpm. In one or more embodiments, the feed section may be divided into multiple temperature zones. In other embodiments, the feed section includes only one temperature zone. In one or more embodiments, the temperature zones within the feed section may be set at a temperature of at least 200° F. (93.3° C.), in other embodiments, at least 250° F. (121° C.), in other embodiments, at least 300° F. (149° C.), in other embodiments, at least 350° F. (177° C.), in other embodiments, at least 400° F. (204° C.), and in other embodiments, at least 450° F. (232° C.).

As the blend is conveyed through the feed section, it then enters the compression section where conveying of the material continues and a majority of the melt blending of the material is accomplished. In one or more embodiments, substantially all of the melting of the material is accomplished by the end of the melt section, which end is defined by the beginning of the metering section. Where a double-flighted barrier screw is employed in the compression section, the solids portion and the melt portion of the blend are generally divided between the solids channel and the melt channel. As the percentage of the overall blend that is in the melt stage increases, the volume of the melt channel also increases. During this step, solids materials are converted to a molten blend and the molten blend is then transferred over the barrier flight and into the melt channel.

The temperature within the melt or compression section may be divided into multiple zones. In one or more embodiments, the temperature of one or more of the zones within the melt section is at least 400° F. (204° C.), in other embodiments, at least 425° F. (218° C.), in other embodiments, at least 450° F. (232° C.), and in other embodiments, at least 475° F. (246° C.) (e.g., between 450° F. (232° C.) and 500° F. (260° C.)).

The material leaving the compression zone and entering the metering zone of the extruder is in the form of a molten blend. This molten blend is then conveyed through the metering section of the extruder. Prior to entry into the metering section or at one or more locations within the metering section, the molten blend is subjected to mixing by one or more mixing elements. This step of mixing serves to assist in homogenizing the molten blend and also serves to impart positive pressure on the molten blend in a downstream direction.

The metering section may be divided into multiple temperature zones. In other embodiments, the metering section may include one temperature zone. In one or more embodiments, the metering section is set to a temperature of at least 375° F. (191° C.), in other embodiments, at least 400° F. (204° C.), in other embodiments, at least 425° F. (218° C.), and in other embodiments, at least 450° F. (232° C.) (e.g., 400° F. (204° C.) to 475° F. (246° C.)).

The molten blend is conveyed to the end of the metering section where it is then extruded through one or more dies out of the extruder. The extrudate may be handled by any conventional procedures depending on the nature of the extrudate. For example, the extrudate may be cooled or otherwise further processed.

During one or more steps of conveying the blend (either the solids blend or the molten blend), the blend is subjected to a pressure imparted by the compression ratio of the extruder. As discussed above, this pressure may be indicative or proportional to that degree of pressure imparted by a compression ratio of at least 1.20, in other embodiments, at least 1.30, in other embodiments, at least 1.40, in other embodiments, at least 1.45, in other embodiments, at least 1.50, in other embodiments, at least 1.6, in other embodiments, at least 1.7, and in other embodiments, at least 2.5, in other embodiments, at least 3.0, in other embodiments, at least 3.5, in other embodiments, at least 4.5, in other embodiments, at least 5.0, and in other embodiments, at least 5.5.

Practice of the present invention advantageously provides a mixing and extrusion process that experiences little or no surging and provides useful output at conventional mixing speeds. For example, in one or more embodiments, practice of the present invention may provide an output from a 2.5 inch (6.4 cm) extruder of at least 70 lbs/hr (32 kg/hr), in other embodiments, at least 80 lbs/hr (36 kg/hour), in other embodiments, at least 90 lbs/hr (41 kg/hour), and in other embodiments, at least 100 lbs/hr (45 kg/hour) while operating at 80 rpm.

Introducing Pourable Resin

As discussed above, the problems associated with the prior art can also be solved by introducing a pourable resin modifier with a molten polyolefin. This technique allows the polyolefin and the resin modifier to be subsequently mixed within one or more extruders.

The term pourable resin modifier refers to a resin modifier that has been heated above the softening point of the resin modifier to a temperature at which the resin modifier will pour or flow. In one or more embodiments, a pourable resin modifier is pumpable.

Accordingly, practice of these embodiments includes (i) heating a polyolefin to a temperature above the melting point of the polyolefin to form a molten polyolefin; (ii) heating a resin modifier above the softening point of the resin modifier to form a pourable resin modifier; (iii) introducing the molten polyolefin with the pourable resin modifier to form a blend; and (iv) mixing the blend.

The step of heating the polyolefin to a temperature above the melting point of the polyolefin may take place by exposing the polyolefin to temperatures of at least 200° F. (93.3° C.), in other embodiments, at least 250° F. (121° C.), in other embodiments, at least 300° F. (149° C.), in other embodiments, at least 350° F. (177° C.), in other embodiments, at least 400° F. (204° C.), and in other embodiments, at least 450° F. (232° C.). The step of heating the polyolefin to a temperature above the melting point of the polyolefin forms a molten polyolefin, which is a polyolefin in a liquid state and is therefore flowable and pumpable.

The step of heating the polyolefin may take place within an extruder such as a single-screw extruder, although other devices may be used to heat the polyolefin and then the molten polyolefin can be pumped into a mixing apparatus by use of a metering pump or extruder.

The step of heating the resin modifier to a temperature above the softening point of the resin modifier may take place by exposing the polyolefin to temperatures of at least 176° F. (80° C.), in other embodiments, at least 194° F. (100° C.), in other embodiments, at least 230° F. (110° C.), in other embodiments, at least 248° F. (120° C.), in other embodiments, at least 266° F. (130° C.), and in other embodiments, at least 284° F. (140° C.). The step of heating the resin modifier to a temperature above the softening point of the resin modifier forms a pourable resin modifier. In one or more embodiments, the resin modifier is heated to a temperature at least 9° F. (5° C.), in other embodiments, at least 18° F. (10° C.), in other embodiments, at least 36° F. (20° C.), in other embodiments, at least 54° F. (30° C.), in other embodiments, at least 72° F. (40° C.), and in other embodiments, at least 90° F. (50° C.) above the ring and ball softening point of the resin modifier.

The step of heating the resin modifier may take place within a conventional container that is capable of being heated. In particular embodiments, the step of heating the resin modifier may take place within an extruder such as a single-screw extruder, although other devices may be used to heat the resin modifier and then the pourable resin modifier can be pumped into a mixing apparatus by use of a metering pump or extruder.

A specific example of process for introducing molten polyolefin and pourable resin modifier can be described with reference to FIG. 3. This exemplary process employs a single-screw extruder 50, which includes barrel 52, screw 54, feed throat 56, optional feed hopper 57 in fluid communication with feed throat 56, and outlet 58. As with previous embodiments, screw 54 generally includes a shaft 60 and helical flight(s) 61 extending from shaft 60. Space 62, which may also be referred to as channel 62, exists between screw 54 and barrel 52. Feed throat 56 and outlet 58 are in fluid communication with channel 62.

Extruder 50 generally includes at least three distinct geometric sections along the linear length of the extruder. The first section may be referred to as feed section 70, the second section may be referred to as compression section 72, and the third section may be referred to as metering section 74.

In one or more embodiments, a mixing element 73 may be positioned within metering section 74. Practice of these embodiments is not particularly limited by the selection of any particular mixing element or device. Examples of useful mixing elements are described above for previous embodiments, and these elements or devices may be employed in practicing these embodiments.

In one more embodiments, extruder 50 includes one or more openings 76, which opening are in addition to feed throat 56 and outlet 58. One or more openings 76 are in fluid communication with channel 62. In one or more embodiments, one or more openings 76 are vent ports within barrel 52, and therefore they may be referred to as vent port(s) 76. In particular embodiments, at least one vent port 66 is located in compression section 72. In other embodiments, at least one vent port is located in metering section 74. In one or more embodiments, at least one vent port 76 is located upstream of any mixing element 73 that may be present within metering section 74; for example, vent port 76 is positioned between mixing element 73 and feed throat 56.

A container 78 is in fluid communication with vent port 76. In one or more embodiments, container 78 is a heated container. In particular embodiments, container 78 may include an extruder such as a single or multi-screw extruder. In other embodiments, container 78 may include a heated feeder, such as those described in U.S. Pat. No. 4,913,641, which is incorporated herein by reference. Container 78 may be placed in fluid communication with vent port 76 by employing appropriate conduit, which is generally known in the art. Optional metering devices 80, such as melt pumps, as well as optional flow regulators and back-flow stops, may optionally be positioned between container 78 and vent port 76. In certain embodiments, not shown, a combination of a container 78, such as a heated container, and an extruder or heated feeder, may be placed in fluid communication with vent port 76.

Figure 3:
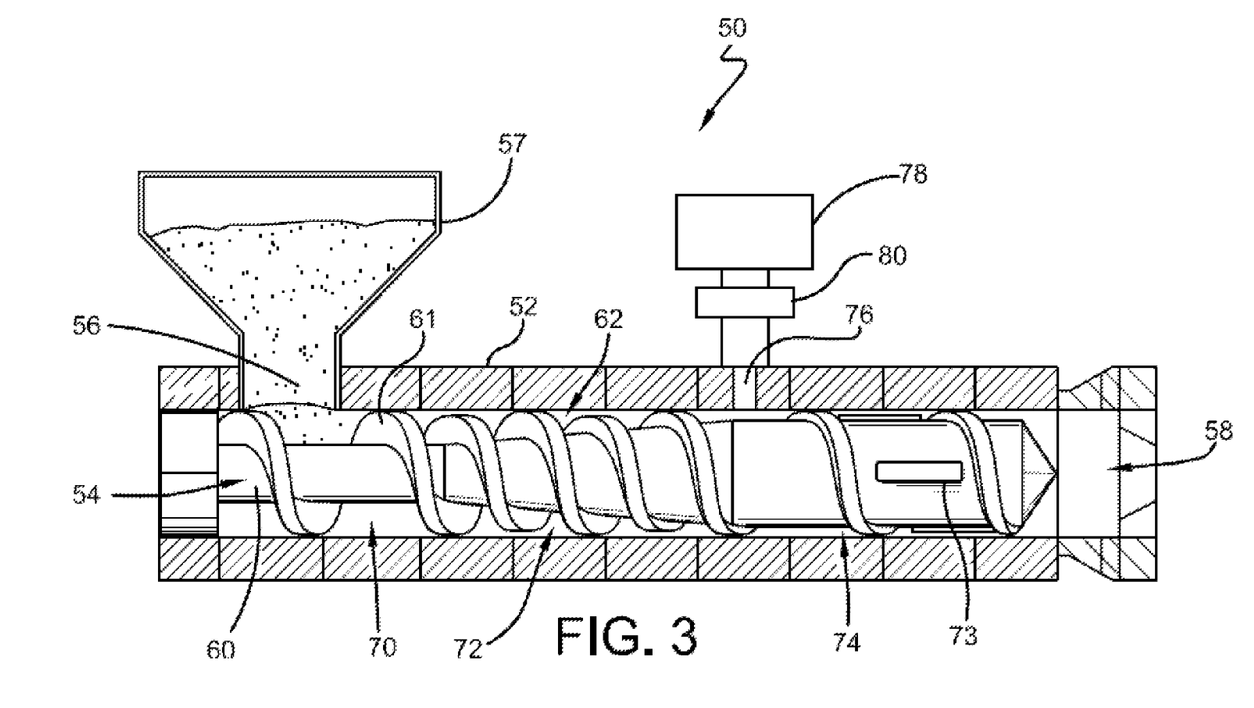
FIG. 3 is a partial cross-sectional view taken along the length of an exemplary single-screw extruder employed in one or more embodiments of the present invention.

With reference still to FIG. 3, practice of the methods of these embodiments includes placement of polyolefin into feed hopper 57 and delivery of the polyolefin into channel 62 via feed throat 56. In one or more embodiments, polyolefin is fed to hopper 57 in its neat state. In particular embodiments, polyolefin is fed to hopper 57 in the form of pellet or crumb.

By operation of screw 54 and by optionally applying heat to barrel 52 within feed section 70, the polyolefin travels through feed section 70 toward compression section 72 as its temperature nears its melting point and the polyolefin begin to melt. Operation of the screw, and with the addition of optional heat to barrel 52 in compression section 72, the polyolefin achieves a temperature where the polyolefin is in its molten state.

Resin modifier is introduced to container 78 where it is heated to form a pourable resin modifier. The pourable resin modifier is transferred to channel 62 where it is introduced with the molten polyolefin. The pourable resin modifier may be transferred through appropriate conduit into vent port 76 and ultimately into channel 62. Transfer of the pourable resin modifier may be facilitated by use of a pump, extruder, or feeder.

Once inside channel 62, the pourable resin modifier is introduced with and mixed with the molten polyolefin by operation of the screw, which also serves to transfer the blend of molten polyolefin and pourable resin modifier through channel 62 toward outlet 58. The blend of molten polyolefin and pourable resin modifier may undergo additional mixing by operation of mixing element or device 73.

Another specific example of process for introducing molten polyolefin and pourable resin modifier can be described with reference to FIG. 4. This exemplary process employs a first a single-screw extruder 80. As with the extruders of previous embodiments, extruder 80 includes barrel 82, screw 84, feed throat 86, optional feed hopper 87 in fluid communication with feed throat 86, and outlet 88. Screw 84 includes helical flight(s) 91 extending from shaft 90, and a space 92, which may also be referred to as channel 92, exists between screw 84 and barrel 82, and is in fluid communication with feed throat 86 and outlet 88.

In one or more embodiments, the design of screw 84 may be similar to the extruder shown in FIG. 3, which includes at least three distinct geometric sections along the linear length of the extruder including the a feed section, a compression section, and a metering section. Or, as shown in FIG. 4, extruder 80 may be a plasticating-type extruder that includes at least one geometric section along the linear length of the extruder. In one or more embodiments, and as shown in FIG. 4, the geometric design of screw 84 is a compression design where the diameter of shaft 90 increases and the depth of channel 92 decreases along the linear length of the extruder.

First extruder 80 is in fluid communication with a second extruder 100. Extruder 100 includes barrel 102, screw 104, feed throat 106, and outlet 108. Screw 104 includes helical flight(s) 111 extending from shaft 110, and a space 112, which may also be referred to as channel 112, exists between screw 104 and barrel 102, and is in fluid communication with feed throat 106 and outlet 108. The geometry of screw 104 is not necessarily limited in practicing the present invention. As shown in FIG. 4, the screw geometry may generally be of a metering design where in the diameter of barrel 102 and the depth of channel 112 do not appreciably change along the linear length of the extruder. In one or more embodiments, second extruder 100 may be referred to as hot-melt extruder 100.

Figure 4:
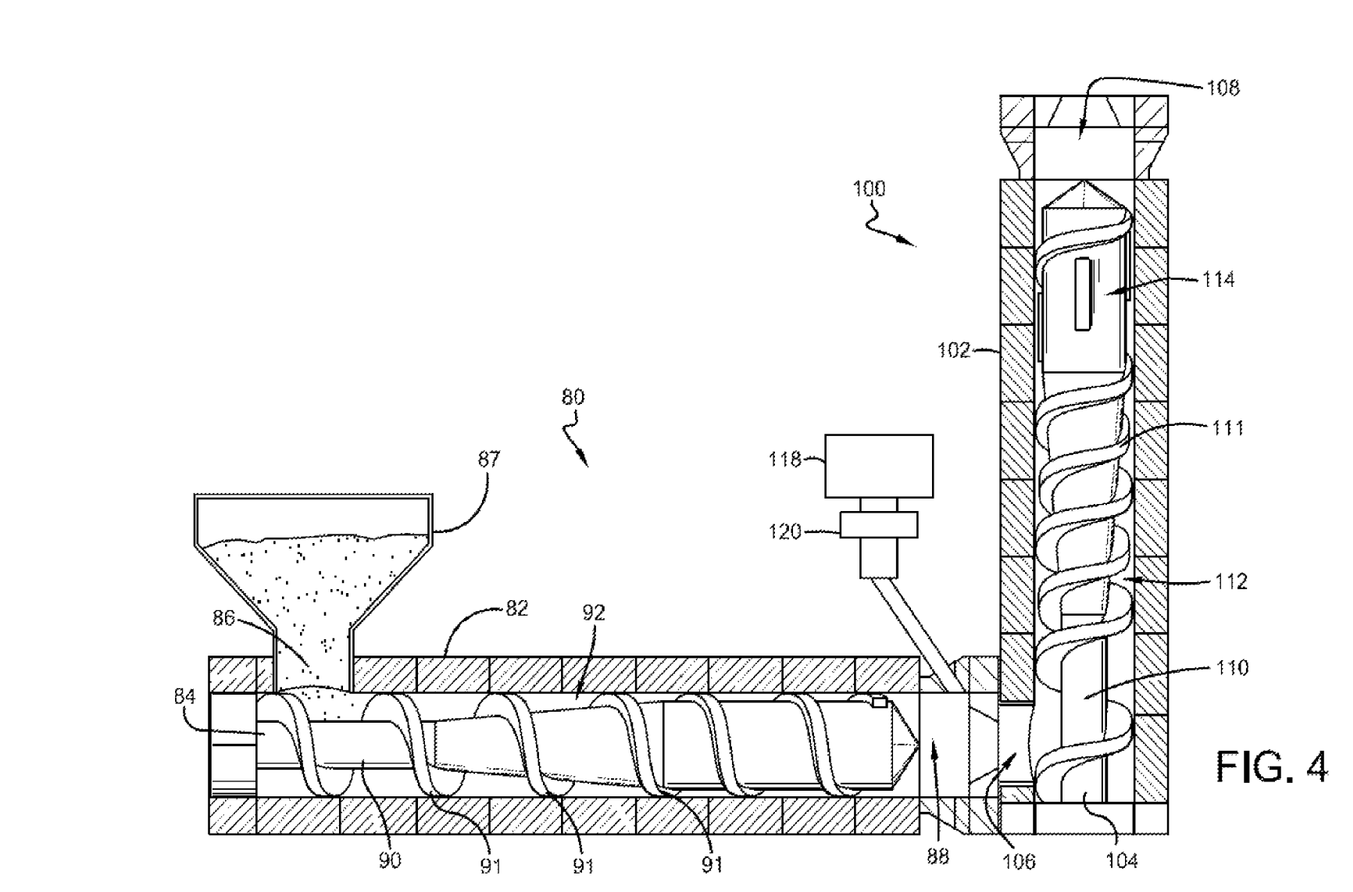
FIG. 4 is a partial cross-sectional view taken along the length of a pair of single-screw extruders positioned in series as employed in one or more embodiments of the present invention.

Second extruder 100 may be equipped with a mixing section 114 as generally shown in FIG. 4. Practice of these embodiments is not particularly limited by the selection of any particular mixing element or device. Examples of useful mixing elements are described above for previous embodiments, and these elements or devices may be employed in practicing these embodiments.

A container 118 is in fluid communication with feed throat 106 of second extruder 100. As with previous embodiments, container 118 can be a heated container and may include an extruder such as a single or multi-screw extruder or a heated feeder. Container 118 may be placed in fluid communication with feed throat 106 by employing appropriate conduit, which is generally known in the art. Optional metering devices 120, such as melt pumps, as well as optional flow regulators and back-flow stops (not shown), may optionally be positioned between container 118 and feed throat 106. In certain embodiments, not shown, a combination of a container 118, such as a heated container, and an extruder or heated feeder, may be placed in fluid communication with feed throat 106.

With reference still to FIG. 4, practice of the methods of these embodiments includes placement of polyolefin into feed hopper 87 and delivery of the polyolefin into channel 92 via feed throat 86. In one or more embodiments, polyolefin is fed to hopper 87 in its neat state. In particular embodiments, polyolefin is fed to hopper 87 in the form of pellet or crumb.

By operation of screw 84 and by optionally applying heat to barrel 82, the polyolefin travels along the length of extruder 80 from feed throat 86 toward outlet 88 while the application of mechanical forces and/or heat drives the polyolefin toward its melting point and the polyolefin begins to melt. Ultimately, the polyolefin achieves a temperature where the polyolefin is in its molten state within first extruder 80. By operation of screw 84, the molten polymer is pumped to outlet 88 and into second extruder 100.

Resin modifier is introduced to container 118 where it is heated to form a pourable resin modifier. The pourable resin modifier is transferred to second extruder 100 where it is introduced with the molten polyolefin. The pourable resin modifier may be transferred through appropriate conduit into feed throat 106 and ultimately into channel 112 of second extruder 100. Transfer of the pourable resin modifier may be facilitated by use of a pump, extruder, or feeder as described above with regard to the previous embodiments.

Once inside channel 112 of second extruder 100, the pourable resin modifier is introduced with and mixed with the molten polyolefin by operation of screw 104, which also serves to transfer the blend of molten polyolefin and pourable resin modifier through channel 112 toward outlet 108. The blend of molten polyolefin and pourable resin modifier may undergo additional mixing within mixing section 114.

Another specific example of process for introducing molten polyolefin and pourable resin modifier can be described with reference to FIG. 5. This exemplary process employs a twin-screw extruder 120, which includes barrel 122, first and second screws 123, 124, feed throat 126, optional feed hopper 127 in fluid communication with feed throat 126, and outlet 128. As generally known in the art, barrel 122 may include a plurality of barrel subcomponents linked together, each in fluid communication with each other, to form the length of extruder 120. And, as known in the art, screws 123, 124 generally include various elements, such as mixing, back-mixing, kneading, and conveying elements (not necessarily shown in the Figs.), and the elements of each shaft may intermesh with one another. Space 132, which may also be referred to as channel 132, exists between screws 123, 124 and barrel 134. Feed throat 126 and outlet 128 are in fluid communication with channel 132.

As known in the art, the size of the overall extruder 120, as well as any locations along the length of the extruder, can be described in terms of the unit L/D, which refers to the length over the internal diameter of the barrel. For example, extruder 120 may have an over length of 40 L/D, and therefore the midpoint along the length of the extruder can be defined as the location 20 L/D. Typically, feed through 126 is located in the first 5 L/D of the extruder.

In one more embodiments, extruder 120 includes one or more openings 136, which opening are in addition to feed throat 126 and outlet 128. One or more openings 136 are in fluid communication with channel 132. In one or more embodiments, opening 136 is a vent port within one or more barrels.

A container 138 is in fluid communication with opening 136. As with other embodiments, container 138 may be a heated container and may include an extruder such as a single or multi-screw extruder, as well as a heated feeder as described in U.S. Pat. No. 4,913,641, which is incorporated herein by reference. Container 138 may be placed in fluid communication with vent opening 136 by employing appropriate conduit, which is generally known in the art. Optional metering devices 140, such as melt pumps, as well as optional flow 30 regulators and back-flow stops, may optionally be positioned between container 138 and opening 136. In certain embodiments, not shown, a combination of a container 138, such as a heated container, and an extruder or heated feeder, may be placed in fluid communication with opening 136.

Figure 5:
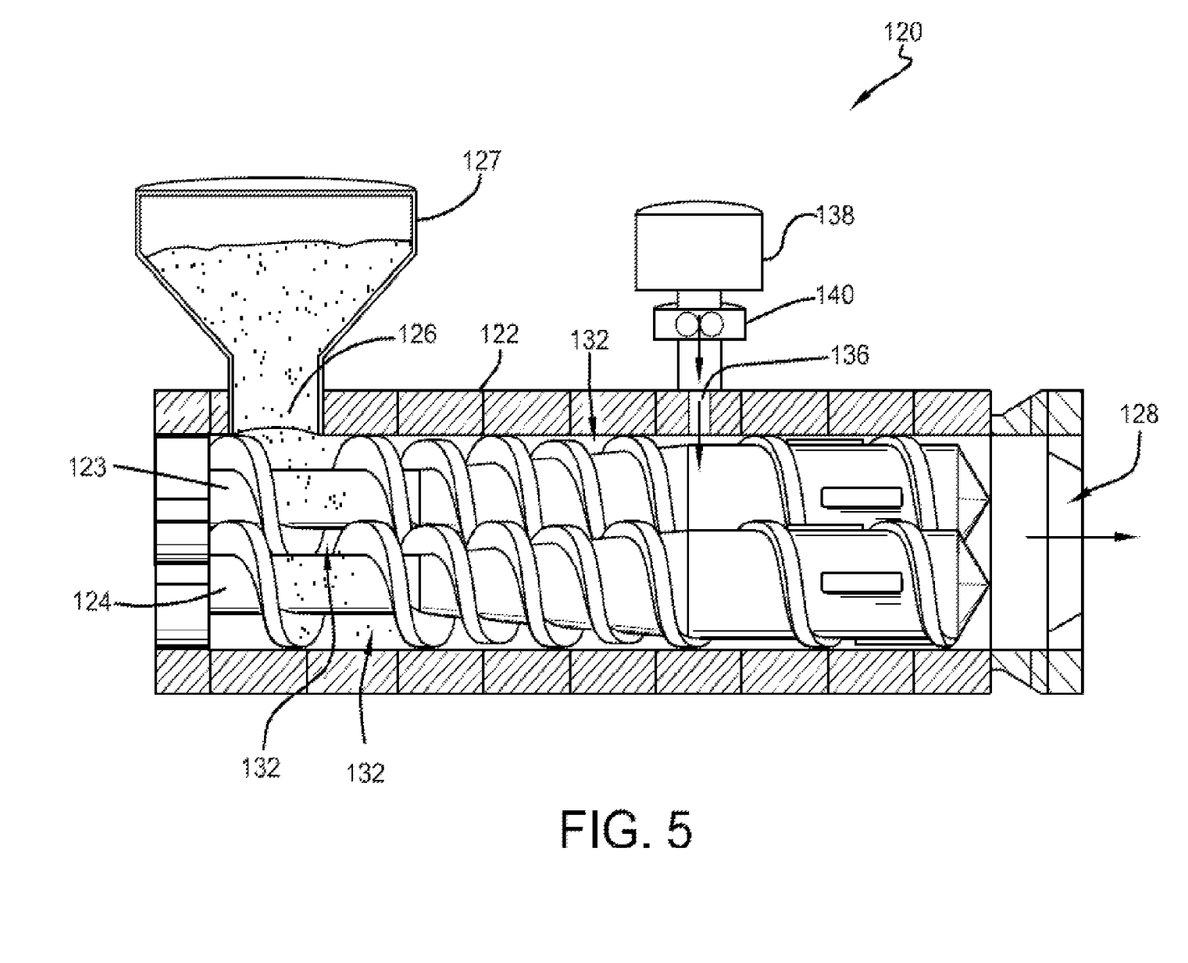
FIG. 5 is a partial cross-sectional view taken along the length of a twin-screw extruder employed in one or more embodiments of the present invention.

With reference still to FIG. 5, practice of the methods of these embodiments includes placement of polyolefin into feed hopper 127 and delivery of the polyolefin into channel 122 via feed throat 126. In one or more embodiments, polyolefin is fed to hopper 127 in its neat state. In particular embodiments, polyolefin is fed to hopper 127 in the form of pellet or crumb.

By operation of screws 123, 124 and by optionally applying heat to barrel 122, the polyolefin is conveyed along the length of extruder 120 while optionally undergoing mixing and/or masticating as its temperature nears the melting point of the polyolefin and the polyolefin begins to melt. Operation of the screws 123, 124, and with the addition of optional heat to barrel 122, the polyolefin achieves a temperature where the polyolefin is in its molten state.

Resin modifier is introduced to container 78 where it is heated to form a pourable resin modifier. The pourable resin modifier is transferred to channel 122 where it is introduced with the molten polyolefin. The pourable resin modifier may be transferred through appropriate conduit into opening 136 and ultimately into channel 122. Transfer of the pourable resin modifier may be facilitated by use of a pump, extruder, or feeder.

Once inside channel 122, the pourable resin modifier is introduced with and mixed with the molten polyolefin by operation of the screws 123, 124, which also serve to convey the blend of molten polyolefin and pourable resin modifier through channel 122 toward outlet 1288. Additionally, the blend of molten polyolefin and pourable resin modifier may undergo various forms of mixing within extruder 120 by selection of various mixing elements positioned along the length of the screw downstream of opening 136.

Use and Product

In one or more embodiments, the product resulting from the process of the present invention is a homogenous blend of the polyolefin and resin modifier. As those skilled in the art appreciate, homogenous blend refers to a blend of materials that, when analyzed at 1,000 times magnification (e.g., scanning electron microscope) an extracted sample of the blend is devoid or substantially devoid of vacuoles or voids; extraction of the blend usually takes place in toluene at 149° F. (66° C.). In one or more embodiments, the extracted blend is devoid or substantially devoid of vacuoles that are greater than 5 microns, in other embodiments, greater than 4 microns, and in other embodiments, greater than 3 microns in size.

In one or more embodiments, the molten blend produced according the present invention is formed into a film. The film may be obtained by any of the conventional techniques including cast extrusion, flat film processes, or tubular processes. The film may be subjected to orientation processing in order to give uniaxially orientation, or in certain embodiments, biaxially orientation, which may be achieved by drawing in two mutually perpendicular directions in the plane of the film to impact strength thereto.

Orientation of flat film may be effected by a tenter technique, while orientated tubular film may be suitably produced by extruding the polymeric materials in the form of a tube from an annular die, cooling the extruded tube (the cast tube), reheating and inflating the tube by the so-called "bubble" process to introduce transverse orientation, and simultaneously elongating the tube longitudinally to orientate the film in a lengthwise direction. The film may then be "heat-set", i.e., dimensional stability of the film is improved by heating the film, while restrained against thermal shrinkage, to a temperature above the glass transition temperature of the polymer from which the film is formed, but below the melting point thereof.

The degree of orientation may be the same or different in the two directions of the plane of the film, for twist wrapping uses it is preferred that the orientation be greater in the one direction, preferably the longitudinal direction.

In one or more embodiments, the films may vary in thickness depending on the intended application, but films of a thickness of from 2 microns to 150 microns are usually suitable. Films intended for packaging are usually from 10 microns to 60 microns thick. The thickness of each outer layer may be from 0.05 microns to 2.5 microns. The films are particularly useful for twist wrapping.

In one or more embodiments, the film may also be coated particularly to improve heat sealability. Examples of coating films for heat sealability, the coating techniques and coating materials used may be found in United Kingdom Patents 1440317; 1452424; 1495776; 2028168; 1569112; 1566077; 1550570; 2098542; and European Patents and Applications 0128077A; 0126640A; 0002606B; 0015472B; 0012405B; 0060037A; 0061238B; 0008904B; and 0027586B.

Where improved heat sealability is required, the film may be coated on both surfaces with 1 wt % to 20 wt % (e.g., 1 wt % to 10 wt % and particularly about 5 wt %) for the or each surface based on the weight of the base layer, of a random copolymer of 80 wt % to 99 wt % of propylene and 1 wt % to 20 wt % of ethylene. This copolymer may include 90 wt % to 99 wt %, especially 94 wt % to 98 wt %, e.g., about 95.5 wt % of propylene, the remainder being ethylene.

Useful random copolymers of propylene and ethylene may include isotactic propylene-ethylene copolymer with a density of from 0.86 g/cc to 0.92 g/cc as measured at 23° C. according to ASTM D1505 and a melt flow index of from 2 to 15 g/10 min as determined according to ASTM D1238 (conditions 230° C. and 2.16 kg). It may be made by well-known polymerization methods using a Ziegler catalyst, for example, $AlCl_3$ and $TiCl_4$.

For twist wrapping applications, the base layer of the film may contain 20 wt % to 30 wt % resin and may be the only layer of the film. Alternatively, this base layer may be coated on one or both surfaces with other polymers to enhance some desired properties such as the use of polypropylene to improve machineability.

Coated films of this invention (e.g., multilayer films) are suitably formed by combining the components (which may if desired include other components such as an antistatic medium, blocking agents and slip aids) of the base layer and surface layers in a conventional manner such as by a simultaneous co-extrusion technique.

Specific Embodiments

Paragraph A: A process for preparing a blend of thermoplastic polymer and resin modifier, the process comprising the steps of: (i) charging neat thermoplastic polymer to a single-screw extruder; (ii) charging neat resin modifier to the extruder; (iii) conveying the thermoplastic polymer and resin modifier through a feed section of the extruder to form a blend, where the feed section has a feed depth; (iv) conveying the blend through a compression section of the extruder to thereby form a molten blend; (v) mixing the molten blend after said step of conveying the blend through the compression section to thereby impart positive pressure on the molten blend in a downstream direction; (vi) conveying the molten blend through a metering section, where the metering section has a metering depth; and (vii) extruding the molten blend, wherein the blend or molten blend is subjected to a compression ratio that is at least 1.2, where the compression ratio is the ratio of the feed depth to the metering depth.

Paragraph B: The process of paragraph A, where the blend includes a thermoplastic polymer to resin modifier weight ratio of 95:5 to 5:95.

Paragraph C: The process of paragraphs A-B, where said step of extruding includes forming a film.

Paragraph D: The process of paragraphs A-C, where said step of charging neat thermoplastic polymer includes charging thermoplastic polymer pellets comprising at least 95 wt % of the thermoplastic polymer, and where said step of charging neat resin modifier includes charging resin pellets comprising at least 95 wt % of the resin modifier.

Paragraph E: The process of paragraphs A-D, where the thermoplastic polymer is selected from the group consisting of polypropylene and polyethylene.

Paragraph F: The process of paragraphs A-E, where the resin modifier is selected from the group consisting of liquid and amorphous semi-solid petroleum hydrocarbons, asphalt, hydrocarbon resins, polyterpene resins, coal resins, petroleum resins, rosins, rosin derivatives, and styrene resins.

Paragraph G: The process of paragraphs A-F, where said step of charging thermoplastic polymer and said step of charging resin modifier includes gravimetrically feeding the thermoplastic polymer and resin modifier to the extruder.

Paragraph H: The process of paragraphs A-G, where the feed section has a length ≥5 L/D.

Paragraph I: The process of paragraphs A-H, where the feed section has a length ≥8 L/D.

Paragraph J: The process of paragraphs A-I, where the feed section includes a channel characterized by a feed depth ratio of from 0.150 to about 0.300, and where said step of conveying the thermoplastic polymer and resin modifier through a feed section of the extruder includes conveying the blend through the channel.

Paragraph K: The process of paragraphs A-J, where said step of conveying the thermoplastic polymer and resin modifier through a feed section of the extruder includes subjecting the blend to a temperature of at least 200° F. (93.3° C.).

Paragraph L: The process of paragraphs A-K, where said step of conveying the blend through a compression section of the extruder includes subjecting the blend to a temperature of at least 300° F. (149° C.).

Paragraph M: The process of paragraphs A-L, where said step of conveying the molten blend through a metering section of the extruder includes subjecting the blend to a temperature of at least 350° F. (177° C.).

Paragraph N: The process of paragraphs A-M, where the compression section includes a first channel having a depth that increases from an upstream point to a downstream point and a second channel having a depth that decreases from the upstream point to the downstream point.

Paragraph O: The process of paragraphs A-N, where the metering section has a length ≥4 L/D.

Paragraph P: The process of paragraphs A-O, where the metering section includes a channel characterized by a metering depth ratio of from 0.01 to about 0.250, and where said step of conveying the thermoplastic polymer and resin modifier through the metering section of the extruder includes conveying the blend through the channel.

Paragraph Q: The process of paragraphs A-P, where the compression ratio is at least 1.2.

Paragraph R: The process of paragraphs A-Q, wherein the resin modifier is selected from the group consisting of petroleum resins, polyterpene resins, coal resins, rosins, and mixtures thereof.

Paragraph S: The process of paragraphs A-R, wherein the resin modifier is selected from the group consisting of cycloaliphatic hydrocarbon resins, hydrogenated cycloaliphatic resins, and aromatic modified cycloaliphatic hydrocarbon resins or mixtures thereof.

Paragraph T: The process of paragraphs A-S, wherein the resin modifier comprises a polypentadiene resin.

Other Specific Embodiments

Paragraph AA: A process for preparing a blend of thermoplastic polymer and resin modifier, the process comprising:

i) heating a thermoplastic polymer to a temperature to form a polymer melt;
ii) heating a resin modifier to a temperature to form a resin modifier melt wherein the resin modifier is a hydrocarbon resin;
iii) introducing the resin modifier melt to the polymer melt to form a blend; and
iv) mixing the blend.

Paragraph AB: The process of paragraph AA, wherein the resin modifier is a hydrocarbon resin selected from the group consisting of petroleum resins, synthetic polyterpenes, coal tar resins, synthetic rosins, and mixtures thereof.

Paragraph AC: The process of paragraph AA or paragraph AB, wherein the resin modifier is a petroleum resin selected from the group consisting of aliphatic hydrocarbon resins, hydrogenated aliphatic hydrocarbon resins, aromatic modified aliphatic hydrocarbon resins, hydrogenated aromatic modified aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, hydrogenated aromatic hydrocarbon resins, polycyclopentadiene resins, hydrogenated polycyclopentadiene resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, and mixtures of two or more thereof.

Paragraph AD: The process of any of the preceding paragraphs, wherein the resin modifier comprises a cycloaliphatic hydrocarbon resin.

Paragraph AE: The process of any of the preceding paragraphs, wherein the resin modifier comprises an aromatic modified cycloaliphatic hydrocarbon resin.

Paragraph AF: The process of any of the preceding paragraphs, wherein the resin modifier has ring and ball softening points of about 50° C. to about 160° C.

Paragraph AG: The process of any of the preceding claims, wherein the number average molecular weights of the resin modifiers are less than about 5 kg/mol.

Paragraph AH: The process of any of the preceding paragraphs, further comprising the step of extruding the blend.

Paragraph AI: The process of any of the preceding paragraphs, where said step of heating takes place within an extruder.

Paragraph AJ: The process of any of the preceding paragraphs, where said step of introducing the resin modifier melt to the polymer melt takes place within the extruder.

Paragraph AK: The process of any of the preceding paragraphs, where said step of mixing the blend takes place within the extruder.

Paragraph AL: The process of any of the preceding paragraphs, where said step of introducing a resin modifier melt to the polymer melt takes place within a second extruder.

Paragraph AM: The process of any of the preceding paragraphs, where said step of heating a thermoplastic polymer takes place within a first extruder and said step of mixing the blend takes place within a second extruder.

Paragraph AN: The process of any of the preceding paragraphs, where said step of heating a thermoplastic polymer and said step of mixing the blend takes place within a multi-screw extruder.

Paragraph AO: The process of paragraph AN, where said multi-screw extruder is a twin-screw extruder.

Paragraph AP: The process of any of the preceding paragraphs, where said step of introducing the resin modifier melt to the polymer melt includes delivering the resin modifier melt through a metering pump and then contacting the resin modifier melt with the polymer melt.

Paragraph AQ: The process of any of the preceding paragraphs, where the thermoplastic polymer is a polyolefin selected from the group consisting of polypropylene, polyethylene, and blends of polypropylene and polyethylene.

Paragraph AR: The process of any of the preceding paragraphs, where said step of heating a thermoplastic polymer to a temperature includes heating the polyolefin to at least 110° C.

Paragraph AS: The process of any of the preceding paragraphs, where said step of heating a resin modifier to a temperature includes heating the modifier to at least 20° C.

Paragraph AT: The process of any of the preceding paragraphs, where the blend includes a thermoplastic polymer to resin modifier weight ratio of 95:5 to 5:95.

Paragraph AU: The process of any of the preceding paragraphs, where said step of extruding includes forming a film.

Paragraph AV: A process for preparing a blend of thermoplastic polymer and resin modifier, the process comprising the steps of:
i) introducing at least one thermoplastic polymer into an extruder;
ii) heating the thermoplastic polymer to a temperature to form a polymer melt;
iii) introducing into the extruder a molten resin modifier;
iv) mixing the resin modifier with the polymer melt in the extruder to form a blend; and
v) extruding the blend through an extruder die,
wherein the resin modifier is a hydrocarbon resin.

Paragraph AW: A process for preparing a blend of a thermoplastic polymer and resin modifier, the process comprising the steps of:
i) introducing at least one thermoplastic polymer into a plasticating extruder;
ii) heating the thermoplastic polymer to a temperature to form a polymer melt;
iii) extruding the polymer melt from the extruder;
iv) introducing the polymer melt to a second extruder;
v) providing a resin modifier melt;
vi) introducing the resin modifier melt to the second extruder;
vii) mixing the polymer melt and the resin modifier melt within the second extruder to form a blend; and
viii) extruding the blend through a die,
wherein the resin modifier is a hydrocarbon resin.

Paragraph AX: A process for preparing a blend of a thermoplastic polymer and resin modifier, the process comprising the steps of:
i) introducing at least one thermoplastic polymer into a multi-screw extruder;
ii) mixing and heating the thermoplastic polymer within the first two L/D of the extruder to form a polymer melt;
iii) providing a modifier resin melt;
iv) introducing the modifier resin melt into the extruder at a location at least four L/D from the location of said introducing at least one thermoplastic polymer into the plasticating extruder;
v) mixing the polymer melt and the modifier resin within the extruder to form a blend; and
vi) extruding the blend through a die,
wherein the resin modifier is a hydrocarbon resin.

In order to demonstrate the practice of the present invention, the following examples have been prepared and tested.

The examples should not, however, be viewed as limiting the scope of the invention. The claims will serve to define the invention.

EXAMPLES

Comparative Example

In order to demonstrate the advantages of the present invention, an attempt was made to blend polypropylene homopolymer and hydrogenated petroleum resin within a single-screw extruder having an L/D of 30 and an inner diameter of about 2.5 inches (about 6.4 cm). The extruder included a feed section, a compression or melt section, and a metering section. The compression section included barrier screw that was double-flighted; i.e., it included a solids channel and a melt channel divided or separated by a barrier flight. Also, the extruder was generally divided into five temperature zones, with three of the temperature zones included within the compression section. The first temperature zone was set at 220° F. (105° C.), the second zone was set at 325° F. (163° C.), the third zone was set at 425° F. (218° C.), the fourth zone was set at 425° F. (218° C.), and in the fifth zone was set at 425° F. (218° C.). The extruder was equipped with a Maddock-type mixing element between turns 35 and 36. The specifics of the screw profile are set forth in Table I.

TABLE I

| Extruder Sections (Turns) | Inner Diameter | Section Depth | | Barrier Differential |
|---|---|---|---|---|
| Feed Section | | | | |
| 1 | 2.495 | 0.495 | | — |
| 2 | 2.495 | 0.489 | | — |
| 3 | 2.495 | 0.489 | | — |
| 4 | 2.495 | 0.493 | | — |
| 5 | 2.495 | 0.493 | | — |
| 6 | 2.494 | 0.496 | | — |
| Melt Section | | | | |
| | | Melt | Solids | |
| 7 | 2.494 | 0.221 | | — |
| 8 | 2.494 | | 0.497 | 0.082 |
| 9 | 2.494 | 0.224 | | — |
| 10 | 2.494 | | 0.438 | 0.076 |
| 11 | 2.494 | 0.240 | | — |
| 12 | 2.494 | | 0.409 | 0.071 |
| 13 | 2.494 | 0.236 | | — |
| 14 | 2.494 | | 0.387 | 0.068 |
| 15 | 2.494 | 0.241 | | — |
| 16 | 2.494 | | 0.363 | 0.067 |
| 17 | 2.494 | 0.264 | | — |
| 18 | 2.494 | | 0.337 | 0.064 |
| 19 | 2.494 | 0.284 | | — |
| 20 | 2.494 | | 0.308 | 0.061 |
| 21 | 2.494 | 0.331 | | — |
| 22 | 2.494 | | 0.299 | 0.065 |
| 23 | 2.494 | 0.363 | | — |
| 24 | 2.494 | | 0.280 | 0.052 |
| 25 | 2.494 | 0.375 | | — |
| 26 | 2.495 | | 0.256 | 0.052 |
| 27 | 2.495 | 0.386 | | — |
| 28 | 2.495 | | 0.214 | 0.047 |
| 29 | 2.495 | 0.400 | | — |
| 30 | 2.495 | | 0.169 | 0.048 |
| 31 | 2.495 | 0.416 | | — |
| 32 | 2.495 | | 0.135 | 0.047 |
| Metering Section | | | | |
| 33 | 2.495 | 0.417 | | — |
| 34 | 2.495 | 0.416 | | — |
| 35 | 2.495 | 0.413 | | — |
| Mixing Element | | | | |
| 36 | 2.494 | 0.413 | | — |
| 37 | 2.494 | 0.414 | | — |

The polypropylene homopolymer, which was characterized by an MFR of 2.8 (ASTM D1238@230° C. and 2.16 kg load), and the hydrogenated petroleum resin, which was characterized by a Ring and Ball softening point of 140° C., were fed into the feed throat of the extruder by employing a closed gravimetric feeding system. The weight ratio of polypropylene to petroleum resin was 90:10.

While using this extruder and screw design, the melt blending process was plagued by surging and insufficient output; i.e., output was less than 10 lbs/hr and eventually dropped to zero output.

Inventive Examples

In a similar fashion to the Comparative Example, an attempt was made to blend polypropylene homopolymer and hydrogenated petroleum resin within a single-screw extruder having an L/D of 32 and an inner diameter of about 2.5 inches (about 6.4 cm). The extruder was equipped with a Maddock-type mixing element between turns 29 and 30 L/D. The extruder likewise included a feed section, a compression or melt section, and a metering section. The melt section included a barrier flight screw. Also, the extruder was divided into five temperature zones, three of which were located in the melt section. In a first run, a low-temperature profile was employed whereby the first temperature zone was set at 220° F. (105° C.), the second zone was set at 325° F. (163° C.), the third zone was set at 425° F. (218° C.), the fourth zone was set at 425° F. (218° C.), and in the fifth zone was set at 425° F. (218° C.). In a second run, a high temperature profile was employed whereby the first temperature zone was set at 400° F. (204° C.), the second zone was set at 450° F. (232° C.), the third zone was set at 475° F. (246° C.), the fourth zone was set at 475° F. (246° C.), and in the fifth zone was set at 475° F. (246° C.). The specifics of the screw profile are set forth in Table II.

TABLE II

| Extruder Sections (Turns) | Inner Diameter | Section Depth | | Barrier Differential |
|---|---|---|---|---|
| Feed Section | | | | |
| 1 | 2.4945 | .531 | | — |
| 2 | 2.4947 | .545 | | — |
| 3 | 2.4942 | .548 | | — |
| 4 | 2.4943 | .535 | | — |
| 5 | 2.4945 | .535 | | — |
| 6 | 2.4947 | .537 | | — |
| 7 | 2.4947 | .537 | | — |
| 8 | 2.4946 | .536 | | — |
| 9 | 2.4945 | .533 | | — |
| Melt Section | | | | |
| | | Melt | Solids | |
| 10 | — | — | | — |
| 11 | 2.4944 | | | — |
| 12 | — | | .115 | .064 |

TABLE II-continued

| Extruder Sections (Turns) | Inner Diameter | Section Depth | Barrier Differential |
|---|---|---|---|
| 13 | 2.4946 | .526 | — |
| 14 | — | .170 | .065 |
| 15 | 2.495 | .416 | — |
| 16 | — | .218 | .064 |
| 17 | 2.495 | .352 | — |
| 18 | — | .269 | .062 |
| 19 | 2.495 | .273 | — |
| 20 | — | .290 | .0635 |
| 21 | 2.4949 | .198 | — |
| 22 | — | .347 | .0625 |
| 23 | 2.4946 | .130 | — |
| 24 | — | .318 | — |
| Metering Section | | | |
| 25 | 2.495 | .247 | — |
| 26 | 2.495 | .319 | — |
| 27 | 2.4946 | .309 | — |
| 28 | 2.4949 | .306 | — |
| 29 | 2.4949 | .306 | — |
| Mixing Element | | | |
| 30 | 2.4948 | .310 | — |
| 31 | 2.495 | .307 | — |

As with the Comparative Example, polypropylene homopolymer and hydrogenated petroleum resin were fed into the feed throat of the extruder by employing a closed gravimetric feeding system. The materials were loaded at an 80:20 weight ratio of polypropylene to hydrogenated petroleum resin.

By using the foregoing process together with the extruder and screw geometry as set forth in Table II, effective melt blending of the polypropylene and the hydrogenated petroleum resin was unexpectedly achieved. Indeed, little to no surging was observed and a homogenous product was obtained. The output of the extruder was advantageously measured to be in excess of 80 lbs/hr at 80 rpm for the first temperature profile and in excess of 100 lbs/hr at 80 rpm for the second temperature profile. Trial runs were also conducted where the polyolefin to resin modifier weight ratio was 95:5 and 90:10. Both of these trial runs also provided advantageous results including technologically useful output with little or no surging.

Without wishing to be bound by any particular theory, it is believed that the unexpected and advantageous results obtained when employing the procedure and screw design set forth in Table II can be attributed to one or more of the compression ratio, length of the feed section, feed depth, length of the compression section, and presence of the mixing element. In particular, it is noted that the compression ratio of the extruder profile defined by Table I was 1.2, while the compression ratio of the screw profile set forth in Table III was 1.7. Also, the feed depth for the screw profile set forth in Table I was under 0.5 in (1.3 cm), while the feed depth for the screw profile set forth in Table II was in excess of 0.5 in (1.3 cm).

Various modifications and alterations that do not depart from the scope and spirit of this invention will become apparent to those skilled in the art. This invention is not to be duly limited to the illustrative embodiments set forth herein.

What is claimed is:

1. A process for preparing a blend of thermoplastic polymer and resin modifier, the process comprising the steps of:
(i) charging neat thermoplastic polymer to a single-screw extruder;
(ii) charging neat resin modifier to the extruder;
(iii) conveying the thermoplastic polymer and resin modifier through a feed section of the extruder to form a blend, where the feed section has an average channel depth;
(iv) conveying the blend through a compression section of the extruder to thereby form a molten blend;
(v) mixing the molten blend after said step of conveying the blend through the compression section to thereby impart positive pressure on the molten blend in a downstream direction;
(vi) conveying the molten blend through a metering section of the extruder, where the metering section has an average channel depth;
(vii) extruding the molten blend, wherein the blend or molten blend is subjected to a compression ratio that is at least 1.2, where the compression ratio is the ratio of the feed section average channel depth to the metering section average channel depth; and
wherein the resin modifier is an amorphous or substantially amorphous hydrocarbon resin.

2. The process of claim 1, where the blend includes a thermoplastic polymer to resin modifier weight ratio of 95:5 to 5:95.

3. The process of claim 1, where said step of extruding includes forming a film.

4. The process of claim 1, where said step of charging neat thermoplastic polymer includes charging thermoplastic polymer pellets comprising at least 95 wt % of the thermoplastic polymer, and where said step of charging neat resin modifier includes charging resin pellets comprising at least 95 wt % of the resin modifier.

5. The process of claim 1, where the thermoplastic polymer is a polyolefin selected from the group consisting of polypropylene and polyethylene.

6. The process of claim 1, where said step of charging thermoplastic polymer and said step of charging resin modifier includes gravimetrically feeding the thermoplastic polymer and resin modifier to the extruder.

7. The process of claim 1, where the feed section has a length ≥5 L/D.

8. The process of claim 1, where the feed section has a length ≥8 L/D.

9. The process of claim 1, where the feed section includes a channel characterized by a feed depth ratio of from 0.150 to about 0.300, and where said step of conveying the thermoplastic polymer and resin modifier through a feed section of the extruder includes conveying the blend through the channel.

10. The process of claim 1, where said step of conveying the thermoplastic polymer and resin modifier through a feed section of the extruder includes subjecting the blend to a temperature of at least 200° F. (93.3° C.).

11. The process of claim 1, where said step of conveying the blend through a compression section of the extruder includes subjecting the blend to a temperature of at least 300° F. (149° C.).

12. The process of claim 1, where said step of conveying the molten blend through a metering section of the extruder includes subjecting the blend to a temperature of at least 350° F. (177° C.).

13. The process of claim 1, where the compression section includes a first channel having a depth that increases from an upstream point to a downstream point and a second channel having a depth that decreases from the upstream point to the downstream point.

14. The process of claim 1, where the metering section has a length ≥4 L/D.

15. The process of claim 1, where the metering section includes a channel characterized by a metering depth ratio of from 0.01 to about 0.250, and where said step of conveying the thermoplastic polymer and resin modifier through the metering section of the extruder includes conveying the blend through the channel.

16. The process of claim 1, where the compression ratio is at least 1.5.

17. The process of claim 1, wherein the resin modifier is selected from the group consisting of petroleum resins, polyterpene resins, coal resins, rosins, and mixtures thereof.

18. The process of claim 1, wherein the resin modifier is selected from the group consisting of cycloaliphatic hydrocarbon resins, hydrogenated cycloaliphatic resins, aromatic modified cycloaliphatic hydrocarbon resins, and mixtures thereof.

19. The process of claim 1, wherein the resin modifier comprises a polypentadiene resin.

20. A process for preparing a blend of thermoplastic polymer and resin modifier, the process comprising the steps of:
(i) charging neat polyolefin to a single-screw extruder;
(ii) charging neat resin modifier to the extruder wherein the resin modifier is selected from the group consisting of hydrogenated cycloaliphatic resins, aromatic modified cycloaliphatic hydrocarbon resins, and mixtures thereof;
(iii) conveying the polyolefin and resin modifier through a feed section of the extruder to form a blend, where the feed section has a feed depth;
(iv) conveying the blend through a compression section of the extruder to thereby form a molten blend;
(v) mixing the molten blend after said step of conveying the blend through the compression section to thereby impart positive pressure on the molten blend in a downstream direction;
(vi) conveying the molten blend through a metering section, where the metering section has a metering depth; and
(vii) extruding the molten blend, where during at least one of said step of conveying through a feed section, said step of conveying through a compression section, and said step of conveying through a metering section, the blend or molten blend is subjected to a pressure imparted by a compression ratio that is at least 1.2, where the compression ratio is the ratio of the feed depth to the metering depth.

21. A process for preparing a blend of thermoplastic polymer and resin modifier, the process comprising the steps of:
(i) charging neat thermoplastic polymer to a single-screw extruder;
(ii) charging neat resin modifier to the extruder wherein the resin modifier comprises a polycyclopentadiene resin;
(iii) conveying the thermoplastic polymer and resin modifier through a feed section of the extruder to form a blend, where the feed section has a feed depth;
(iv) conveying the blend through a compression section of the extruder to thereby form a molten blend;
(v) mixing the molten blend after said step of conveying the blend through the compression section to thereby impart positive pressure on the molten blend in a downstream direction;
(vi) conveying the molten blend through a metering section, where the metering section has metering depth; and
(vii) extruding the molten blend, where during at least one of said step of conveying through a feed section, said step of conveying through a compression section, and said step of conveying through a metering section, the blend or molten blend is subjected to a pressure imparted by a compression ratio that is at least 1.2, where the compression ratio is the ratio of the feed depth to the metering depth.

* * * * *